(12) United States Patent
Got et al.

(10) Patent No.: US 10,458,261 B2
(45) Date of Patent: Oct. 29, 2019

(54) INTERMEDIATE CASING GUIDE VANE WHEEL

(71) Applicant: Safran Aircraft Engines, Paris (FR)

(72) Inventors: Marc-Antoine Anatole Got, Lieusaint (FR); Cédric Zaccardi, Saint Maur des Fosses (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 176 days.

(21) Appl. No.: 15/707,428

(22) Filed: Sep. 18, 2017

(65) Prior Publication Data

US 2018/0080332 A1 Mar. 22, 2018

(30) Foreign Application Priority Data

Sep. 19, 2016 (FR) ...................................... 16 58726

(51) Int. Cl.
*F01D 9/04* (2006.01)
*F01D 5/28* (2006.01)

(52) U.S. Cl.
CPC ............. *F01D 9/041* (2013.01); *F01D 5/282* (2013.01); *F01D 9/042* (2013.01); *F05D 2240/12* (2013.01); *F05D 2300/603* (2013.01)

(58) Field of Classification Search
CPC ........ F01D 5/282; F01D 5/3069; F01D 9/041; F01D 9/042; F01D 25/24; F01D 25/246; F05D 2220/36; F05D 2240/12; F05D 2260/31; Y02T 50/672
See application file for complete search history.

(56) References Cited

U.S. PATENT DOCUMENTS

| 8,794,908 | B2* | 8/2014 | Dezouche | F01D 9/042 415/119 |
| --- | --- | --- | --- | --- |
| 2011/0073745 | A1* | 3/2011 | Duchatelle | F01D 9/04 248/637 |
| 2011/0229326 | A1 | 9/2011 | Papin | |
| 2012/0027604 | A1* | 2/2012 | McDonald | F01D 5/282 416/219 R |

(Continued)

FOREIGN PATENT DOCUMENTS

| EP | 2412931 A2 | 2/2012 |
| --- | --- | --- |
| EP | 2798157 A1 | 11/2014 |
| FR | 3032753 A1 | 8/2016 |

OTHER PUBLICATIONS

French Search Report dated May 15, 2017, in corresponding French Application No. 1658726 (2 pages).

*Primary Examiner* — Igor Kershteyn
(74) *Attorney, Agent, or Firm* — Bookoff McAndrews, PLLC

(57) ABSTRACT

An outlet guide vane wheel includes guide vanes made of polymer matrix composite material reinforced by fibers, each having a vane root and a vane tip. The vane roots are fastened on a hub of the wheel by a first connection, and the vane tips are fastened on an outer shroud of the wheel by a second connection. The first connection includes a bearing plane secured to the hub and a first backing plate for securing to the hub, with the vane roots being sandwiched between the bearing plane and the first backing plate. The second connection includes a second backing plate for securing to the shroud, with the vane tips being sandwiched between the shroud and the second backing plate.

14 Claims, 3 Drawing Sheets

(56) References Cited

U.S. PATENT DOCUMENTS

2013/0052004 A1* 2/2013 Stilin .................. F01D 9/042
   415/211.2
2013/0149130 A1* 6/2013 Hasting ............... F01D 9/042
   415/208.1

* cited by examiner

INTERMEDIATE CASING GUIDE VANE WHEEL

CROSS-REFERENCE TO RELATED APPLICATION(S)

This applications claims the benefits of priority to French Patent Application No. 1658726, filed on Sep. 19, 2016, the entirety of which is incorporated by reference herein.

BACKGROUND OF THE INVENTION

The present invention relates to the field of aeroengines, e.g. turbojets, and it relates more particularly to fastening outlet guide vanes (OGVs) between an intermediate casing hub and an intermediate casing outer shroud of such an engine downstream from its fan, the assembly forming that which may be referred to as an intermediate casing OGV wheel.

In such engines, where weight saving is desired, proposals have been made for guide vanes to be made out of polymer matrix composite material reinforced by fibers, e.g. woven in three dimensions (3D woven preforms), while the other components of the wheel, i.e. its hub and the outer shroud, are generally made of metal.

As shown in FIG. 6, the intermediate casing OGV wheel essentially comprises a hub 10 having upstream and downstream flanges 12 and 14 connected together by longitudinal connection arms 16, together with the outer shroud 18. The composite guide vanes 20, which may be thought of as being I-shaped, may be bolted directly firstly to the flanges 12 and 14 of the intermediate casing and secondly to the outer shroud 18 of the intermediate casing. These guide vanes may be structural in the sense that forces are transmitted via the vanes between the outer shroud and the hub. Such an arrangement for an OGV wheel can then present numerous drawbacks:

Firstly, drilling leads to fibers in the preform being broken, thereby leading to local weakening. When heavily stressed, such a zone often gives rise to crack starters, which cracks then propagate often sufficiently for the parts to break.

Secondly, the small contact area under the washer and the screw head, taken together with a high level of tightening as is necessary for fastening purposes, gives rise to very high flattening pressures. The strongly prestressed material then becomes weakened as from the assembly sequence, and when the coefficient of friction is no longer sufficient to withstand loading, the composite part comes into abutment against the shank of the screw. It is then loaded essentially in shear, which is a mode of deformation that composite material withstands poorly. The potential damage may also be made worse by the very small area of contact between the shank of the screw and the portion of the OGV coming into contact therewith.

Furthermore, the shear moduluses of composite materials, which are small in comparison with those of metal materials, do not make it possible to guarantee that stresses are spread spatially sufficiently beyond the fastening zones. The distribution of stresses within the part is therefore very non-uniform in such zones since forces pass mainly along very narrow "strips" lying between two points of fastening. Stresses are therefore at an excessive level in such "strips" and very small elsewhere (a very steep stress gradient), which has a direct impact on the mechanical strength of the part (high stress) and on its overall stiffness (a large amount of deformation between fastenings).

Finally, the rigid embedding does not make it possible to distinguish between directions. Specifically, the forces passing through the guide vanes are generally three-dimensional. Nevertheless, the traction/compression component (along the axis of the vane) is predominant therein. Mechanical strength characteristics are orthotropic, and for a 3D woven preform, its traction strength can be five times greater than its compression strength. Unfortunately, conventional embedding by bolting does not take this feature into account since it does not enable guide vanes to be loaded differently in traction and in compression.

There therefore exists a need for such guide vanes to be fastened in different manner on the hub and the outer shroud of the intermediate casing, making it possible to both conserve the integrity of the composite part and also to optimize the transition of forces while taking account of the orthotropic characteristics of composite material so as to ensure that it is stressed in its preferred direction.

OBJECT AND SUMMARY OF THE INVENTION

A main object of the present invention is thus to mitigate such drawbacks by proposing an OGV wheel comprising guide vanes made of polymer matrix composite material reinforced by fibers, each having an airfoil, a vane root, and a vane tip, said vane roots being fastened to a hub of said wheel by first connection means and said vane tip being fastened to an outer shroud of said wheel by second connection means. Said first connection means include a bearing plane secured to said hub and a first backing plate for securing to said hub, said vane roots being sandwiched between said bearing plane and said first backing plate. Said second connection means include a second backing plate for securing to said shroud, said vane tip being sandwiched between said shroud and said second backing plate.

Thus, by replacing the conventional bolted structure with a sandwiched structure, a connection structure is obtained in which weight is reduced compared with a metal OGV wheel, while enabling loads to be better distributed and while conserving the integrity of the vane (no drilling).

Advantageously, each of said vane roots and of said vane tips is formed by two half-platforms defining connection fillets over the entire width of said airfoil and connecting said airfoil with said half-platforms.

Preferably, said first and second backing plates include curved side edges for fitting closely against said connection fillets.

Advantageously, each of said first and second backing plates is made up of two independent portions, each associated with respective half-platforms of two adjacent airfoils of said wheel.

Preferably, said first and second backing plates are common to two adjacent airfoils of said wheel.

Advantageously, said bearing plane and said shroud for receiving respectively said vane roots and said vane tips are covered in an elastomer material, or in a metal or any other analogous material that is softer than a material forming said backing plate.

Advantageously, said first and second backing plates are fastened to said hub and said shroud respectively by bolts.

Preferably, said fibers are woven in two dimensions and arranged in superposed layers in order to form a preform that is three-dimensional or indeed three-dimensionally woven.

Under such circumstances, the two half-platforms are then advantageously obtained by non-interlinking in the weaving of the fibers of said vanes so as to define over the entire width of said airfoil and on either side thereof the connection fillets connecting said airfoil with said half-platforms.

Preferably, said hub is an intermediate casing hub and said shroud is an intermediate casing shroud (ICS).

The invention also provides any aircraft engine including an OGV wheel as specified above.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF AN EMBODIMENT

Figure 1:
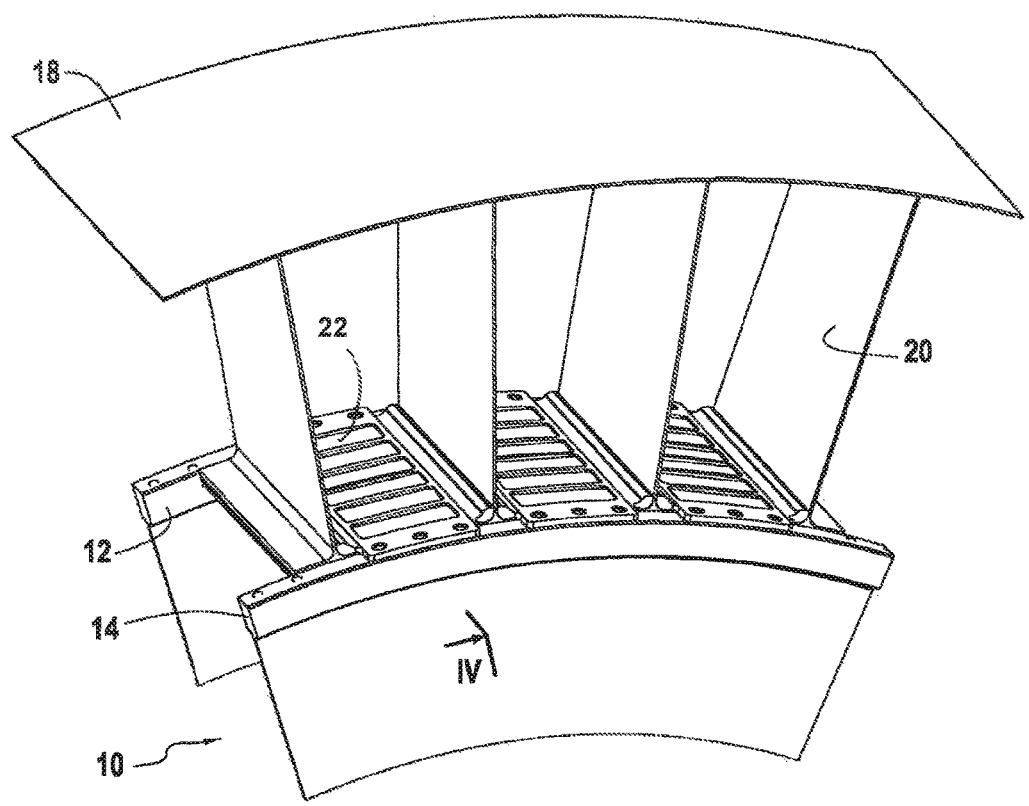
FIG. 1 is a perspective view of a first embodiment of an OGV wheel in accordance with the invention.

FIG. 1 shows an intermediate casing OGV wheel sector made up of a hub 10 having two flanges 12 and 14, one upstream, the other downstream, of the outer shroud 18 of the intermediate casing (this shroud may be referred to as an intermediate casing shroud (ICS)), and of guide vanes 20 secured to the hub and to said ICS by a connection structure in accordance with the invention. Nevertheless, it should be observed that although the figure shows a guide vane downstream from a fan in diagrammatic manner, the invention is also applicable to other guide vanes, e.g. in a compressor first stage.

Figure 2:
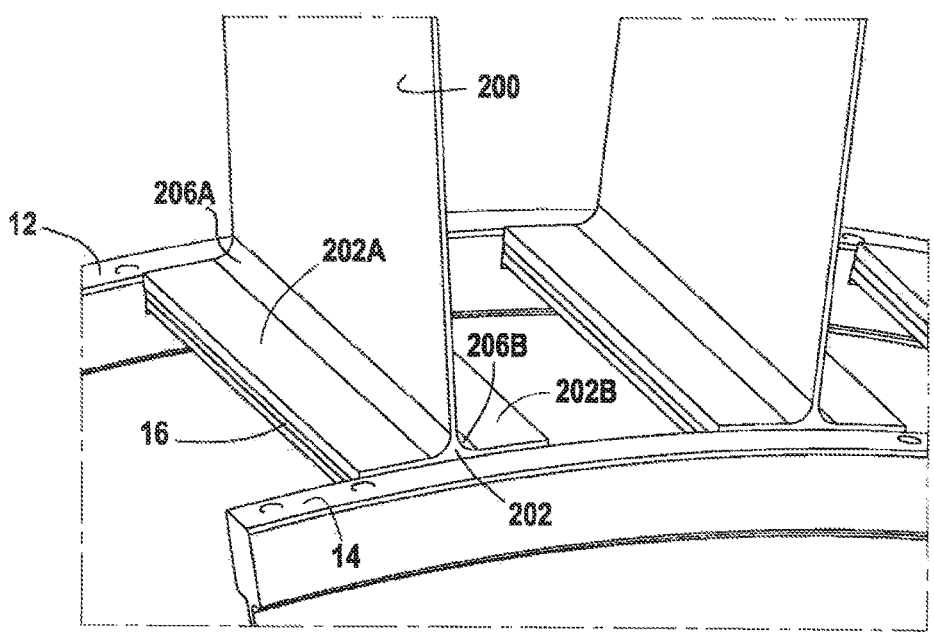
FIGS. 2 and 3 show details of the OGV platform.
Figure 3:
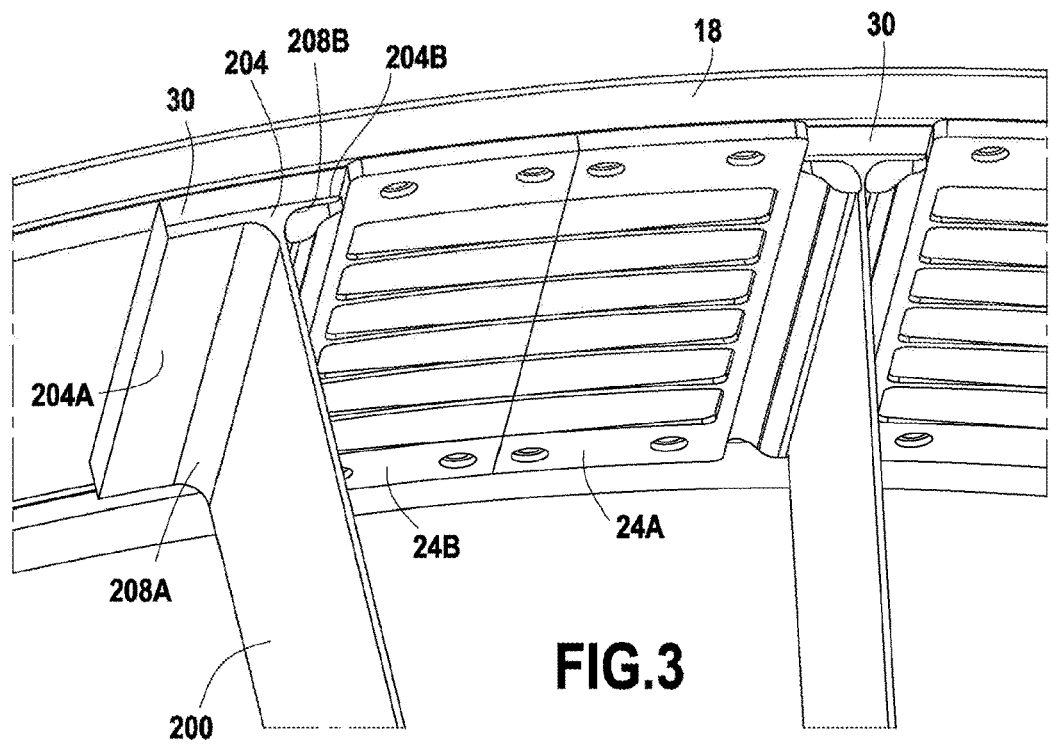

As shown in detail in FIGS. 2 and 3, the guide vane 20 made of polymer matrix composite material reinforced by fibers comprises an airfoil 200 extending radially relative to the main axis of the turbine engine and two platforms 202 and 204 positioned at respective radial ends of the airfoil, substantially perpendicularly thereto, each forming two half-platforms 202A, 202B; 204A, 204B on either side of the airfoil 200 (giving a total of four when distinguishing the bottom or vane root platform 202 and the top or vane tip platform 204) and connected thereto by connection fillets 206A, 206B; 208A, 208B. Preferably, the fibers are woven in three dimensions (3D) and these two half-platforms are obtained by non-interlinking in the 3D woven preform. Nevertheless, it is also possible to envisage using two-dimensional (2D) weaving, the 2D woven fibers then being arranged in superposed layers (plies) presenting local sideways folds in order to form the final 3D preform.

Figure 4:
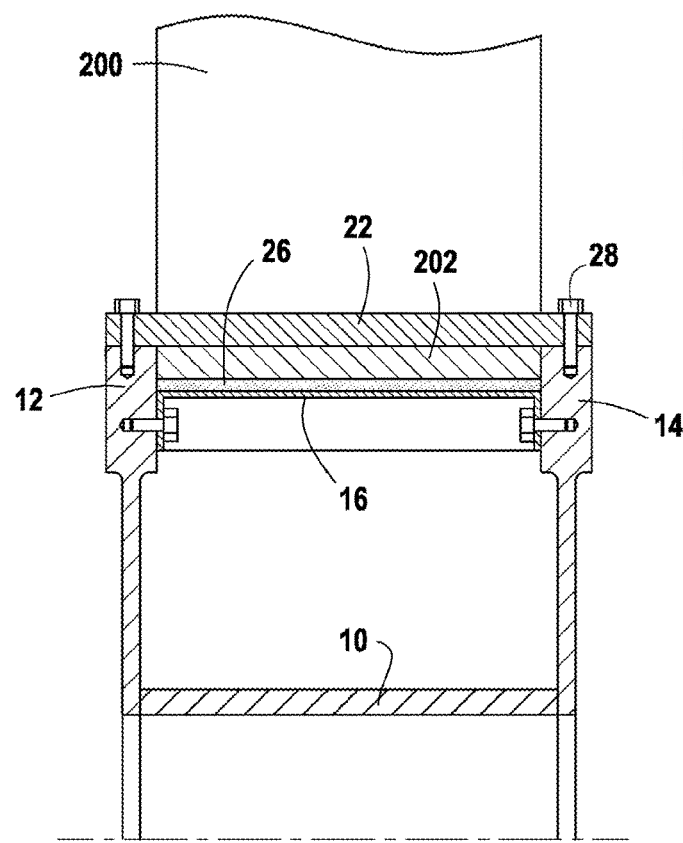
FIG. 4 is a view on plane IV-IV of FIG. 1 showing the support of the OGV platform in detail.

In the invention, at the root of the vane 20, fastening in the intermediate casing is performed by sandwiching each bottom half-platform 202A, 202B between a plane surface of the hub, e.g. a longitudinal arm 16 situated between the flanges 12 and 14, and a first backing plate 22 (shown in FIG. 1) that is ideally made of metal. The longitudinal arm 16 acting as reinforcement may for example be screw-fastened to the flanges 12 and 14 (as shown in FIG. 4), however in a variant that is not shown it is preferably cast integrally with said flanges. The backing plate 22 is bolted directly to the flanges 12 and 14 of the hub. The top half-platforms 204A and 204B are fastened to the intermediate casing shroud 18 in similar manner with a second backing plate likewise being fastened to the ICS by bolts. Specifically, and as shown in FIG. 3, this backing plate that is common to two adjacent OGVs may be replaced by two smaller backing plates 24A and 24B, each dedicated to one particular half-platform of an OGV.

The backing plates have side edges of a curved shape that is designed so as to fit closely against the connection fillets 206A, 206B, 208A, 208B. This imparts a significant improvement to the stiffness and mechanical strength properties of the OGV. Continuous contact between the two parts all along the chord of the vane optimizes the distribution of forces, thereby loading the entire section of the OGV.

As shown in the section of FIG. 4, a layer 26 of elastomer material is preferably interposed between the bottom platform 202 of the OGV and the plane surface 16 of the hub. The half-platforms 202A and 202B are thus sandwiched between the first metal backing plate of high stiffness that is fastened by bolts 28 to the upstream and downstream flanges of the hub and a layer of rubber that is less stiff, preferably being adhesively bonded on the plane surface, thereby imparting asymmetry in the behavior of the OGV in traction and compression. Because of this assembly configuration, force becomes distributed in natural manner within the OGV wheel on a priority basis towards the guide vanes that are stressed in traction (thus having stiff contacts between the vanes and the backing plates) instead of towards the vanes that are stressed in compression (and thus having less stiff contact with the rubber). The distribution of forces depends directly on geometrical characteristics (a function of the desired flexibility, of the desired prestress state, and of the estimated level of wear, . . . ) and on the selected material (stiffness, viscoelasticity rate, hardness, . . . ) as a function of the mechanical properties of the OGV (mainly traction and compression strengths).

Thus, if it is assumed that the ratio between the traction rupture stress threshold (Rmt) and the compression rupture stress threshold (Rmc) is R, it is appropriate to select the stiffness of the elastomer in such a manner that the force seen by the OGV stressed in compression is no more than 1/R times the force seen by the OGV stressed in traction, thereby imposing a ratio of R between the traction stiffness and the compression stiffness of the OGV. In compression, and in order to satisfy the above-explained principle, the flexibility of the elastomer is additional to that of the OGV so the stiffness of the elastomer is equal to $Kt/(R-1)$ where Kt is the stiffness of the OGV alone in traction.

Nevertheless, it should be observed that the elastomer material may be replaced by a metal or any other material that is "softer" than the material of the backing plate. Thus, by way of example, if the backing plate is made of quenched steel, the plane surface may be made of ordinary steel. The term "softer" covers smaller hardness and/or stiffness.

This type of fastening enables the 3D preform to be stressed constantly in the same direction (in the long direction of the airfoil). A warp/weft ratio that is uniform throughout the preform is then preferably selected giving priority to the warp direction, thereby correspondingly simplifying the steps of weaving and of shaping, while also giving rise to significant savings in fabrication costs.

Like the first elastomer material 26 interposed between the bottom platforms and the hub, a layer of a second elastomer material 30, which may optionally be identical to the first and which should be dimensioned in the manner described above, may also be interposed between the top platform 204 of the OGV 20 and the ICS 18 (see FIG. 3).

Because of its outer wall nature, account may also be taken of the ability of the ICS to withstand chemical substances (oil, fuel, acid rain, . . . ).

Above, reference is often made to an OGV of the wheel having only a single airfoil. The number of such vanes in said wheel can be greater or smaller, e.g. about a dozen vanes to three dozen vanes.

Figure 5:
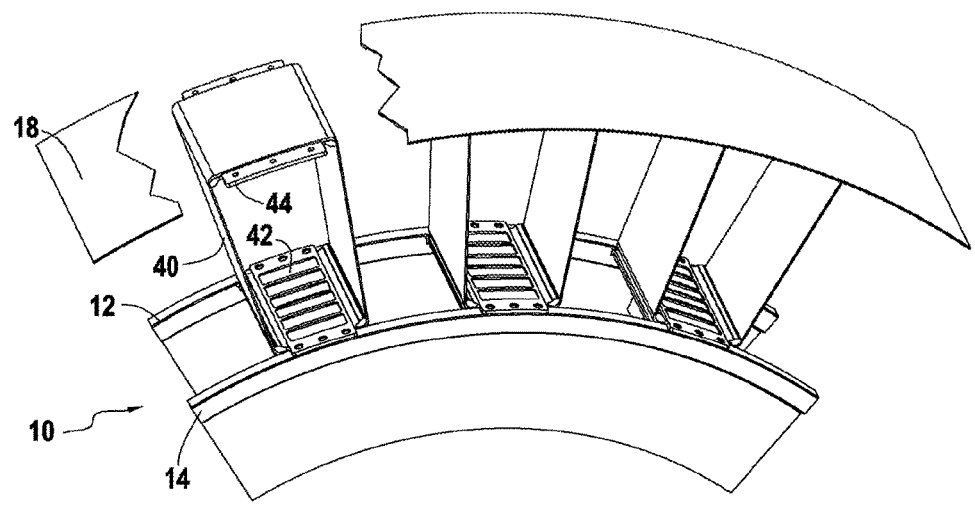
FIG. 5 is a perspective view of a second embodiment of an OGV wheel in accordance with the invention.
Figure 6:
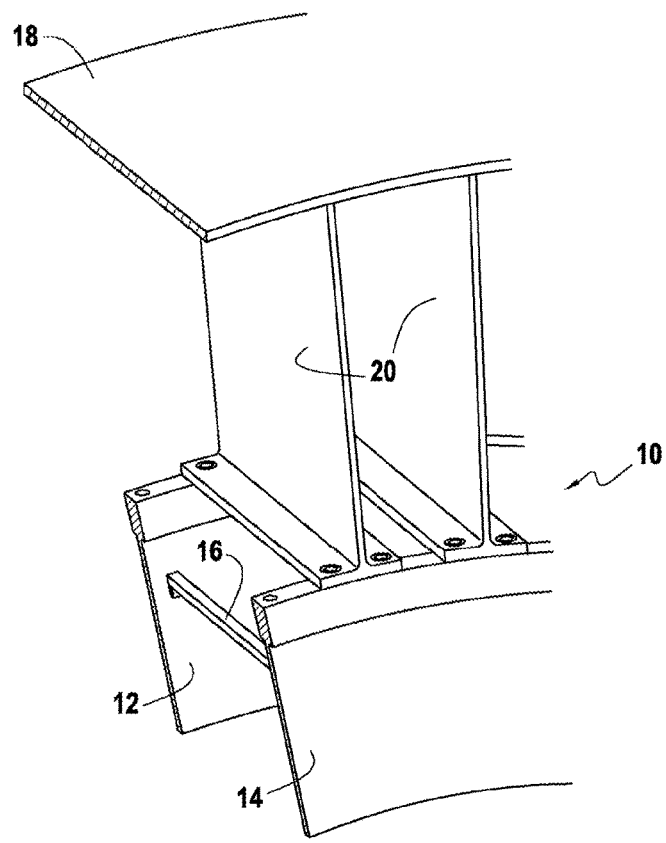
FIG. 6 shows a connection structure of a guide vane in a prior art OGV wheel.

FIG. 5 shows a wheel having an OGV doublet with a single preform. The composite OGV doublet is made up of a single preform 40 forming an O-shape. The backing plates 42 and 44 are then common to two adjacent vanes and are placed in the inter-OGV zone of a single vane doublet, thereby enabling the number of plates to be divided by two, thus obtaining a significant saving in weight. Furthermore, the continuity of the preform, which then does not present any non-interlinking as is needed for making half-platforms on either side of the vane (each vane then having only a half-platform extending the airfoil and running into the corresponding half-platform of the adjacent vane), serves to reinforce the mechanical strength of the OGV.

We claim:

1. An outlet guide vane wheel comprising guide vanes made of polymer matrix composite material reinforced by fibers, each having an airfoil, a vane root, and a vane tip, said vane roots being fastened to a hub of said wheel by first connection means and said vane tips being fastened to an outer shroud of said wheel by second connection means, wherein said first connection means include a bearing plane secured to said hub and a first backing plate for securing to said hub, said vane roots being sandwiched between said bearing plane and said first backing plate without a bolt extending through said vane roots, and said second connection means include a second backing plate for securing to said shroud, said vane tips being sandwiched between said shroud and said second backing plate without a bolt extending through said vane tips.

2. The outlet guide vane wheel according to claim 1, wherein each of said vane roots and of said vane tips is formed by two half-platforms defining connection fillets over an entire width of said airfoil and connecting said airfoil with said half-platforms.

3. The outlet guide vane wheel according to claim 2, wherein said first and second backing plates include curved side edges for fitting closely against said connection fillets.

4. The outlet guide vane wheel according to claim 2, wherein each of said first and second backing plates is made up of two independent portions, each associated with respective half-platforms of two adjacent airfoils of said wheel.

5. The outlet guide vane wheel according to claim 1, wherein said first and second backing plates are common to two adjacent airfoils of said wheel.

6. The outlet guide vane wheel according to claim 1, wherein said bearing plane and said shroud for receiving respectively said vane roots and said vane tips are covered in an elastomer material.

7. The outlet guide vane wheel according to claim 1, wherein said bearing plane and said shroud for receiving respectively said vane roots and said vane tips are covered in a metal or any other analogous material that is softer than a material forming said backing plate.

8. The outlet guide vane wheel according to claim 1, wherein said first and second backing plates are fastened to said hub and said shroud respectively by bolts.

9. The outlet guide vane wheel according to claim 1, wherein said fibers are woven in two dimensions and arranged in superposed layers in order to form a three-dimensional preform.

10. The outlet guide vane wheel according to claim 1, wherein said fibers are woven in three dimensions.

11. The outlet guide vane wheel according to claim 2, wherein the two half-platforms are obtained by non-interlinking in weaving of the fibers of said vanes so as to define over the entire width of said airfoil and on either side thereof the connection fillets connecting said airfoil with said half-platforms.

12. The outlet guide vane wheel according to claim 1, wherein said hub is an intermediate casing hub and said shroud is an intermediate casing shroud.

13. An aircraft engine including the outlet guide vane wheel according to claim 1.

14. The outlet guide vane wheel according to claim 1, wherein said vane roots are sandwiched between said bearing plane and said first backing plate such that the bearing plane and said first backing plate are bolted together outside of said vane roots, and wherein said vane tips are sandwiched between said shroud and said second backing plate such that the shroud and said second backing plate are bolted together outside of said vane tips.

* * * * *